US011990707B2

(12) United States Patent
Nozaki

(10) Patent No.: US 11,990,707 B2
(45) Date of Patent: May 21, 2024

(54) CONNECTOR

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Shinji Nozaki, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 337 days.

(21) Appl. No.: 17/622,374

(22) PCT Filed: Jun. 18, 2020

(86) PCT No.: PCT/JP2020/023881
§ 371 (c)(1),
(2) Date: Dec. 23, 2021

(87) PCT Pub. No.: WO2021/005992
PCT Pub. Date: Jan. 14, 2021

(65) Prior Publication Data

US 2022/0247127 A1 Aug. 4, 2022

(30) Foreign Application Priority Data

Jul. 9, 2019 (JP) ................................ 2019-127910

(51) Int. Cl.
*H01R 13/631* (2006.01)
*H01R 13/502* (2006.01)
(Continued)

(52) U.S. Cl.
CPC ....... *H01R 13/6315* (2013.01); *H01R 13/502* (2013.01); *H01R 13/514* (2013.01); *H01R 13/6272* (2013.01); *H01R 13/639* (2013.01)

(58) Field of Classification Search
CPC ............. H01R 13/6315; H01R 13/502; H01R 13/514; H01R 13/6272; H01R 13/639; H01R 13/64
(Continued)

(56) References Cited

U.S. PATENT DOCUMENTS 5,344,347 A * 9/1994 Inoue ................ H01R 13/6271 439/924.1
5,472,357 A * 12/1995 Yamanashi ........ H01R 13/6273 439/924.1
(Continued)

FOREIGN PATENT DOCUMENTS

JP H08-195255 A 7/1996
JP H09-306589 A 11/1997
JP 2000-195610 A 7/2000

OTHER PUBLICATIONS

International Search Report dated Aug. 25, 2020 for WO 2021/005992 A1 (4 pages).

*Primary Examiner* — Gary F Paumen
(74) *Attorney, Agent, or Firm* — Venjuris, P.C.

(57) ABSTRACT

It is aimed to enable a peak value reduction of connection resistance without hindering a connecting operation. A first housing includes an initial position holding portion for holding a movable housing at an initial position and a connection position holding portion for holding the movable housing at a connection position. A facing interval between the movable housing at the initial position and the second housing is narrower than that between a housing body and the second housing, and a facing interval between the movable housing at the connection position and the second
(Continued)

housing is equal to that between the housing body and the second housing. The second housing is provided with a holding releasing portion for releasing holding by the initial position holding portion when the movable housing reaches a position just before a proper connection position in a connection process to the first housing.

5 Claims, 10 Drawing Sheets

(51) Int. Cl.

| | |
|---|---|
| ***H01R 13/514*** | (2006.01) |
| ***H01R 13/627*** | (2006.01) |
| ***H01R 13/639*** | (2006.01) |

(58) Field of Classification Search

USPC .................................. 439/248, 924.1, 924.2

See application file for complete search history.

(56) References Cited

U.S. PATENT DOCUMENTS

| | | | | |
|---|---|---|---|---|
| 5,727,969 | A * | 3/1998 | Yamanashi | H01R 13/6273 439/594 |
| 6,241,551 | B1 | 6/2001 | Watanabe | |
| 6,666,728 | B2 * | 12/2003 | Tachi | H01R 13/193 439/924.1 |
| 7,438,570 | B2 * | 10/2008 | Mori | H01R 13/62933 439/157 |
| 7,736,197 | B2 * | 6/2010 | Takeda | H01R 13/6456 439/948 |
| 7,934,939 | B2 * | 5/2011 | Chen | H01R 13/639 439/352 |
| 2014/0073192 | A1 | 3/2014 | Wittmann | |
| 2019/0067863 | A1 | 2/2019 | Maesoba et al. | |

* cited by examiner

CONNECTOR

CROSS REFERENCE TO RELATED APPLICATIONS

This application is a national phase of PCT application No. PCT/JP2020/023881, filed on 18 Jun. 2020, which claims priority from Japanese patent application No. 2019-127910, filed on 9 Jul. 2019, all of which are incorporated herein by reference.

TECHNICAL FIELD

The present disclosure relates to a connector.

BACKGROUND

Patent Document 1 discloses a connector for reducing a peak value of connection resistance in a connection process of male and female connectors. In this connector, a female connector housing is composed of two members including a fixed terminal holder and a movable terminal holder. In a connection process of a male connector housing and a female connector housing, a terminal group of the movable terminal holder starts to be connected to a male terminal group of the male connector housing, and connection resistance due to friction between the both terminal groups is generated.

If the connection of the terminal group of the movable terminal holder and the male terminal group is completed, the connection of the terminal group of the fixed terminal holder and the male terminal group starts and connection resistance due to friction between the both terminal groups is generated. The connection resistance is maximized when the connection of the both terminal groups is started. Since the terminal group of the female connector housing is divided into that on a fixed side and that on a movable side and the connection to the male terminal group is started at different timings in the connector of Patent Document 1, the peak value of the connection resistance is reduced.

PRIOR ART DOCUMENT

Patent Document

Patent Document 1: JP H06-111882 A
Patent Document 2: JP H08-195255 A

SUMMARY OF THE INVENTION

Problems to be Solved

In the above conventional connector, the fixed terminal holder and the movable terminal holder are locked and a pushing force applied to the fixed terminal holder is transmitted to the movable terminal holder in an initial stage of the connection. When the connection of the movable terminal holder and the male connector housing is completed, the locking of the fixed terminal holder and the movable terminal holder is released and only the fixed terminal holder moves to start connection to the male connector housing.

The locking of the fixed terminal holder and the movable terminal holder is released by a holding releasing portion on the side of the male connector housing coming into contact with a locked part as the connection proceeds. Thus, to match a connection completion timing of the movable terminal holder and a timing of an unlocking operation by the holding releasing portion, very high dimensional accuracy is required. If the both timings are shifted, the locking of the movable terminal holder and the fixed terminal holder is not released and the connection of the fixed terminal holder cannot proceed also after the connection of the movable terminal holder is completed.

A connector of the present disclosure was completed on the basis of the above situation and aims to enable a peak value reduction of connection resistance without hindering a connecting operation.

Means to Solve the Problem

The present disclosure is directed to a connector with a first housing and a second housing to be connected to the first housing, wherein the first housing includes a housing body and a movable housing relatively displaceable between an initial position and a connection position with respect to the housing body, the first housing includes an initial position holding portion for restricting a relative displacement of the movable housing at the initial position in a direction away from the second housing and a connection position holding portion for restricting a relative displacement of the movable housing at the connection position in the direction away from the second housing, a facing interval between the movable housing and the second housing is narrower than that between the housing body and the second housing with the movable housing located at the initial position, the facing interval between the movable housing and the second housing is equal to that between the housing body and the second housing with the movable housing located at the connection position, and the second housing is provided with a holding releasing portion for releasing holding by the initial position holding portion when the movable housing reaches a position just before a proper connection position in a connection process to the first housing.

Effect of the Invention

According to the present disclosure, it is possible to reduce a peak value of connection resistance without hindering a connecting operation.

DETAILED DESCRIPTION TO EXECUTE THE INVENTION

Description of Embodiments of Present Disclosure

Figure 1:
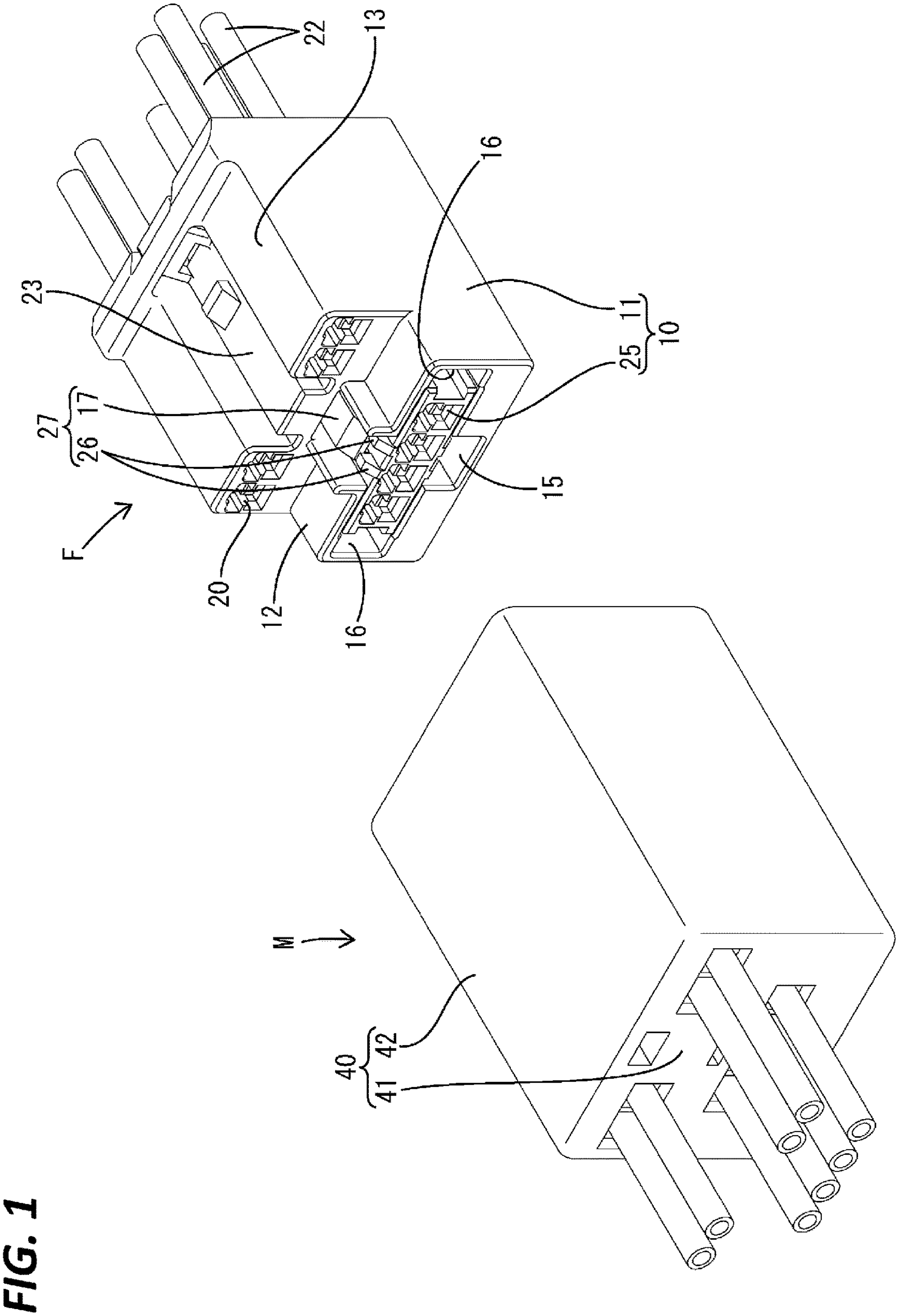
FIG. 1 is a perspective view showing a state where a first housing and a second housing are separated.
Figure 2:
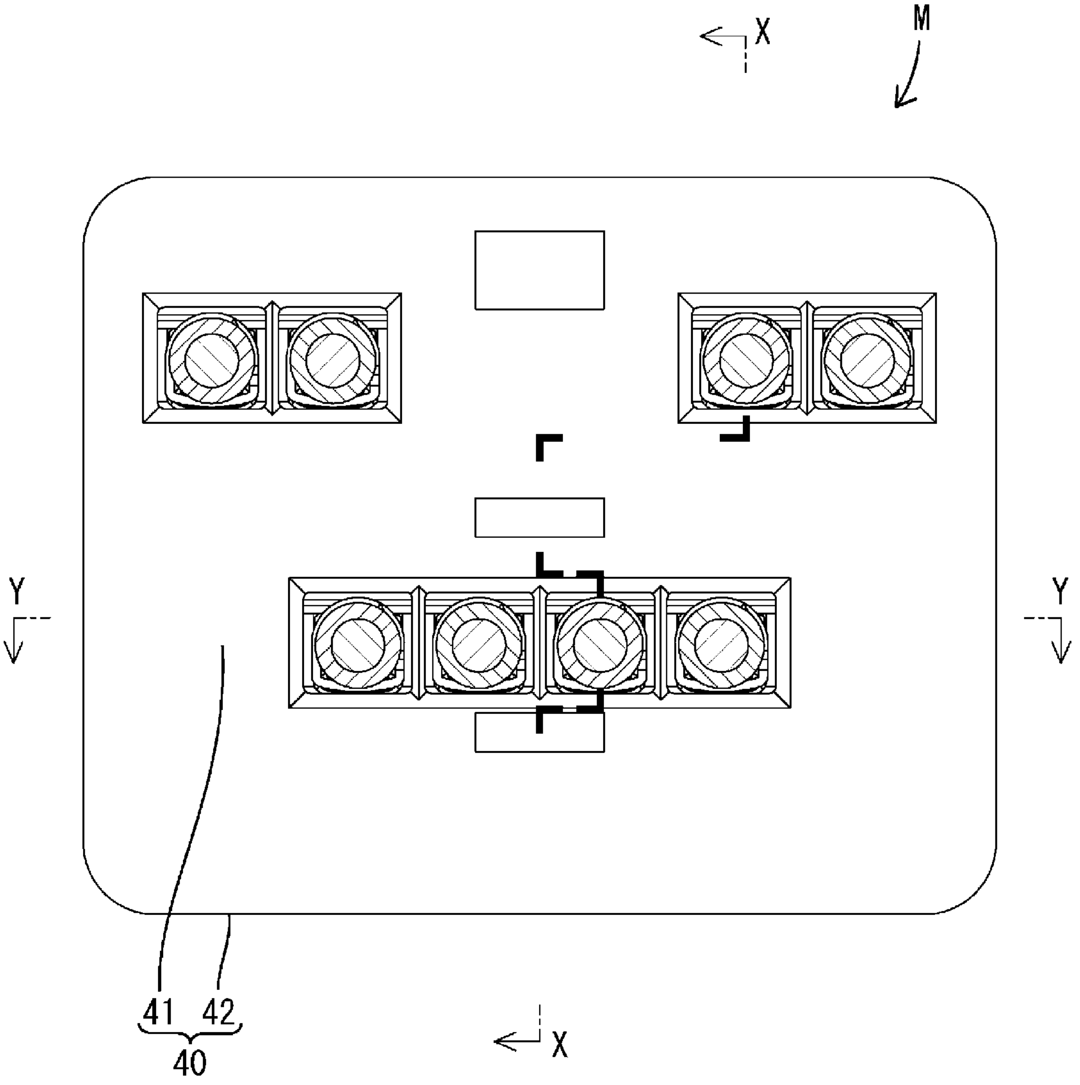
FIG. 2 is a back view of the second housing.

First, embodiments of the present disclosure are listed and described.

(1) The connector of the present disclosure includes a first housing and a second housing to be connected to the first housing, wherein the first housing includes a housing body and a movable housing relatively displaceable between an initial position and a connection position with respect to the housing body, the first housing includes an initial position holding portion for restricting a relative displacement of the movable housing at the initial position in a direction away from the second housing and a connection position holding portion for restricting a relative displacement of the movable housing at the connection position in the direction away from the second housing, a facing interval between the movable housing and the second housing is narrower than that between the housing body and the second housing with the movable housing located at the initial position, the facing interval between the movable housing and the second housing is equal to that between the housing body and the second housing with the movable housing located at the connection position, and the second housing is provided with a holding releasing portion for releasing holding by the initial position holding portion when the movable housing reaches a position just before a proper connection position in a connection process to the first housing.

In the present disclosure, the "facing interval to the second housing" means a moving distance of the housing body/movable housing from a position facing the second housing in a state before connection to a position where the connection to the second housing is completed.

According to the configuration of the present disclosure, if the connection of the first and second housings is started with the movable housing held at the initial position, no connection resistance is generated between the housing body and the second housing in an initial stage of the connection. After the movable housing reaches the position just before the proper connection position, the holding by the initial position holding portion is released. Thus, no connection resistance is generated between the movable housing and the second housing. Since the movable housing is held at the connection position in a final stage of the connection, the movable housing and the housing body are integrally and properly connected. According to the present disclosure, a peak value of the connection resistance can be reduced without hindering a connecting operation.

(2) Preferably, the movable housing is at least partially accommodated in the housing body with the movable housing located at the initial position. According to this configuration, the interference of external matters with the movable housing can be prevented when the movable housing is at the initial position.

(3) Preferably, the initial position holding portion is exposed on an outer surface of the housing body with the movable housing located at the initial position. According to this configuration, whether or not the initial position holding portion is exhibiting a holding function can be visually confirmed.

(4) Preferably, the housing body is formed with a retaining portion, the movable housing is formed with a locking portion, and a relative displacement of the movable housing in a direction toward the second housing is restricted by the locking portion locking the retaining portion when the movable housing is at the initial position. According to this configuration, in separating the first housing from the second housing, if the housing body is pulled rearward, the locking portion locks the restricting portion, whereby the movable housing is separated from the second housing integrally with the housing body.

(5) Preferably, the retaining portion is integrally formed to the initial position holding portion. According to this configuration, the shape of the housing body can be simplified as compared to the case where the restricting portion is formed in a location different from the initial position holding portion.

DETAILS OF EMBODIMENT OF PRESENT DISCLOSURE

Embodiment

A specific embodiment of a connector of the present disclosure is described with reference to FIGS. 1 to 10. Note that the present invention is not limited to these illustrations and is intended to be represented by claims and include all changes in the scope of claims and in the meaning and scope of equivalents. The connector of this embodiment includes a female connector F and a male connector M. In the following description, a left side in FIGS. 3 to 10 is defined as a front side concerning a front-rear direction of the female connector F, and a right side in FIGS. 3 to 10 is defined as a front side concerning a front-rear direction of the male connector M. Upper and lower sides shown in FIGS. 1 to 3, 5, 7 and 9 are directly defined as upper and lower sides concerning a vertical direction. Left and right sides shown in FIGS. 2, 4, 6 and 8 are directly defined as left and right sides concerning a lateral direction.

Figure 3:
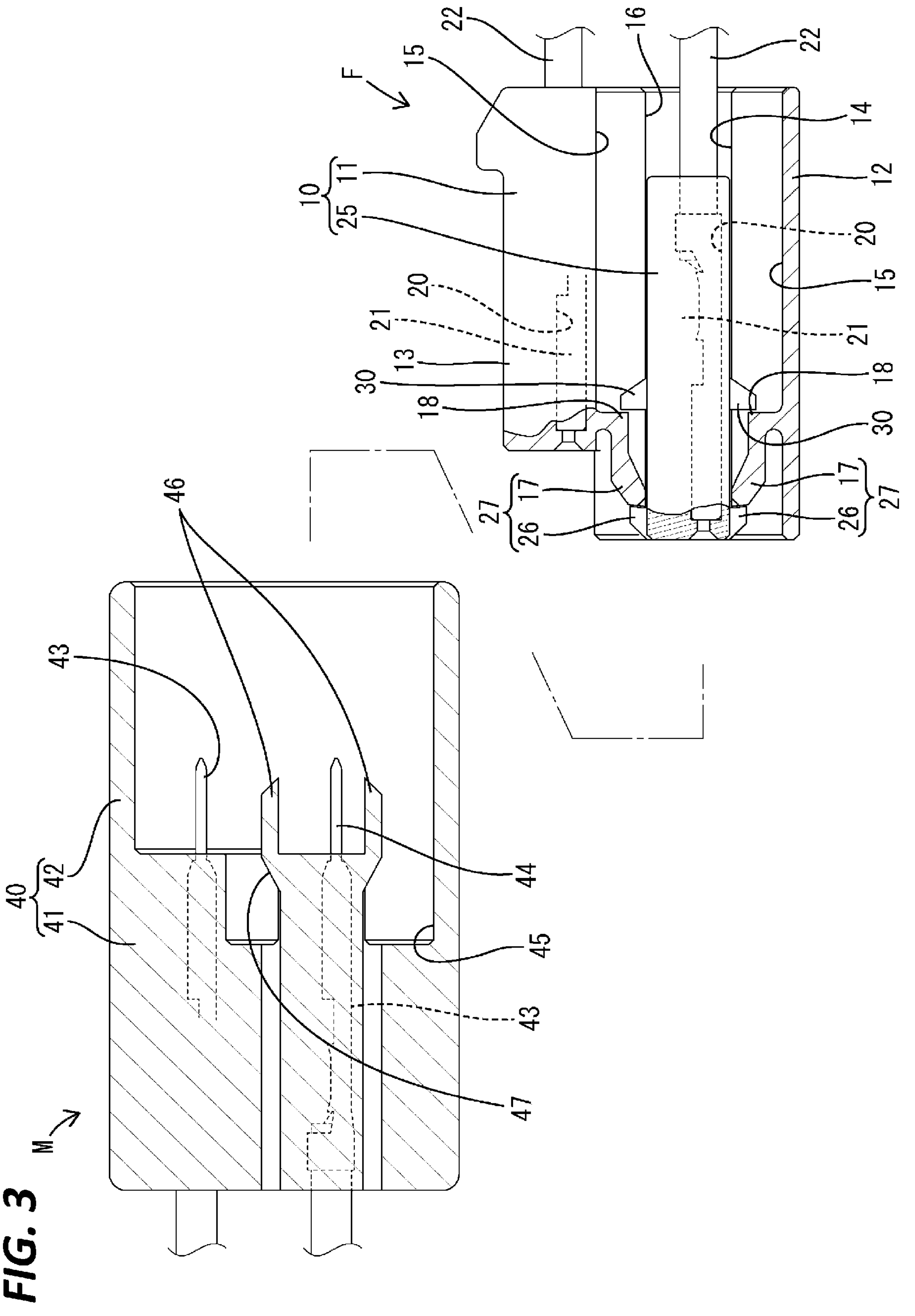
FIG. 3 is a section corresponding to line X-X of FIG. 2 in the state where the first and second housings are separated.
Figure 4:
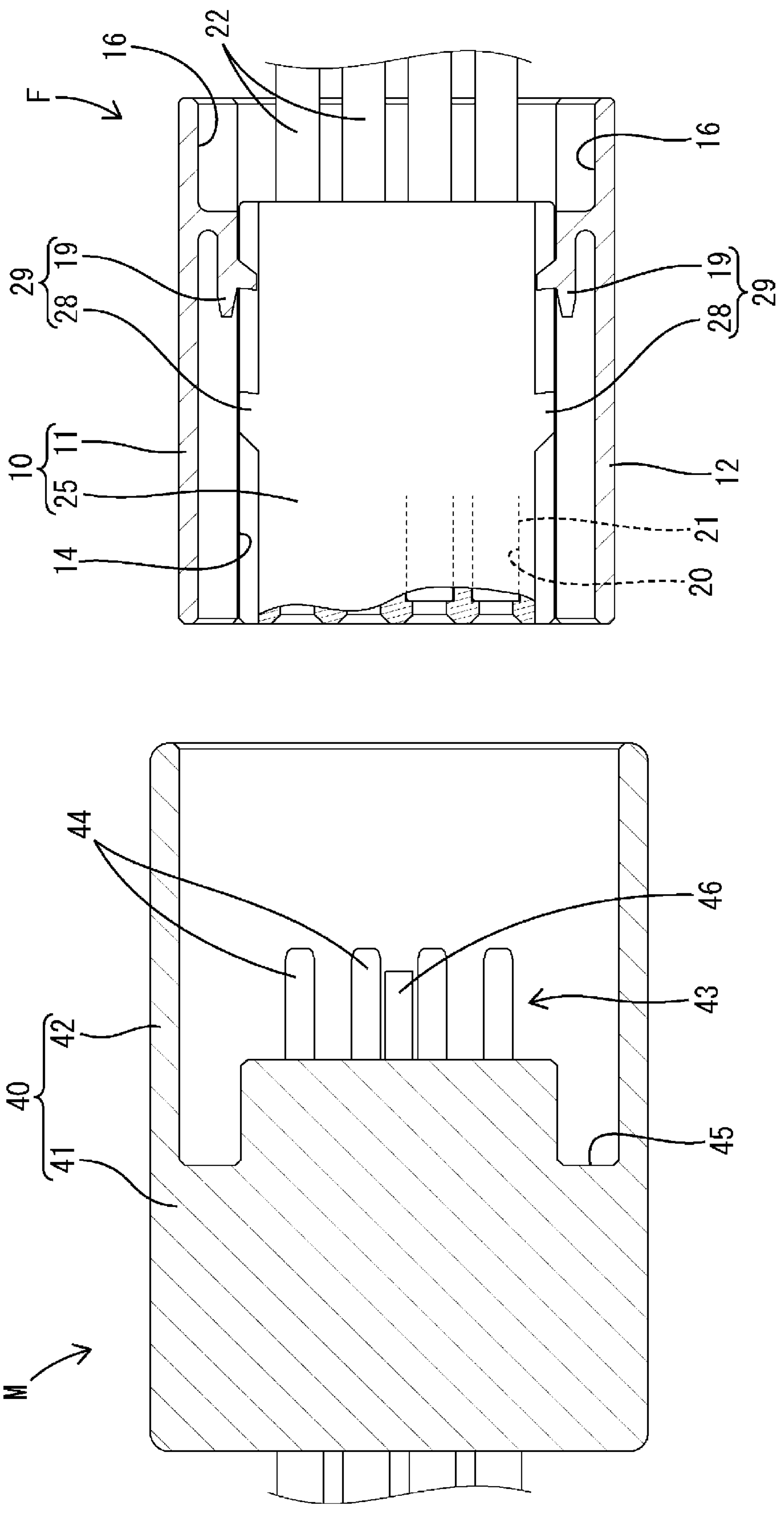
FIG. 4 is a section corresponding to line Y-Y of FIG. 2 in the state where the first and second housings are separated.

The female connector F includes a first housing 10 and a plurality of first terminal fittings 21. The first housing 10 is configured by assembling a housing body 11 made of synthetic resin and a movable housing 25 made of synthetic resin. The housing body 11 includes a housing accommodating portion 12 having a rectangular parallelepiped shape and a terminal accommodating portion 13 likewise having a rectangular parallelepiped shape. As shown in FIGS. 3 and 4, a movable chamber 14, a pair of upper and lower first mold removal spaces 15, and a pair of left and right second mold removal spaces 16 are formed inside the housing accommodating portion 12. Any of the movable chamber 14, the first mold removal spaces 15 and the second mold removal spaces 16 penetrates through the housing accommodating portion 12 and is open in the front surface and rear surface (back surface) of the housing accommodating portion 12.

The first mold removal spaces 15 are arranged in a laterally central part of the housing accommodating portion 12 and communicate with the upper and lower surfaces of the movable chamber 14. As shown in FIG. 3, a pair of vertically symmetrical first arm portions 17 are formed in front end parts of the first mold removal spaces 15. The first arm portion 17 is cantilevered forward (forward in a connecting direction of the first housing 10 to the second housing 40). The first arm portion 17 is resiliently deformable in the vertical direction (direction orthogonal to the connecting direction of the first and second housings 10, 40). A rear end part of the first arm portion 17 functions as a retaining portion 18.

The second mold removal spaces 16 are arranged in both left and right end parts of the housing accommodating portion 12 and arranged at the same height as the movable chamber 14 in the vertical direction. The second mold removal spaces 16 communicate with both left and right end parts of the movable chamber 14. As shown in FIG. 4, a pair of bilaterally symmetrical second arm portions 19 are formed in rear end side regions of the second mold removal spaces 16. The second arm portions 19 are cantilevered forward, similarly to the first arm portions 17. The second arm portions 19 are resiliently deformable in the lateral direction (direction orthogonal to the connecting direction of the first and second housings 10, 40 and orthogonal to resilient deforming directions of the first arm portions 17).

The terminal accommodating portion 13 is integrated with the housing accommodating portion 12 while being stacked on the upper surface of the housing accommodating portion 12. As shown in FIG. 3, a plurality of terminal accommodation chambers 20 elongated in the front-rear direction are formed inside the terminal accommodating portion 13. As shown in FIG. 3, the female first terminal fittings 21 are inserted into the terminal accommodation chambers 20 from behind (back side) of the terminal accommodating portion 13. Wires 22 crimped to rear end parts of the first terminal fittings 21 are drawn out rearward to the outside of the terminal accommodating portion 13. As shown in FIG. 1, a lock arm 23 is formed in a laterally central part on the upper surface of the terminal accommodating portion 13.

A lateral dimension of the terminal accommodating portion 13 is equal to that of the housing accommodating portion 12, and both left and right outer side surfaces of the housing accommodating portion 12 and those of the terminal accommodating portion 13 are continuous and flush with each other. A front-rear dimension of the terminal accommodating portion 13 is smaller than that of the housing accommodating portion 12, and the rear surface (back surface) of the terminal accommodating portion 13 and the rear surface (back surface) of the housing accommodating portion 12 are continuous and flush with each other. Accordingly, the front surface of the terminal accommodating portion 13 is located behind that of the housing accommodating portion 12, and a front end part of the housing accommodating portion 12 projects further forward than the terminal accommodating portion 13. A front end part of the upper first mold removal space 15 is open in the upper surface of the housing accommodating portion 12, and the upper first arm portion 17 is exposed to outside on the upper surface of the housing accommodating portion 12.

The movable housing 25 is in the form of a flat rectangular parallelepiped having a lateral dimension larger than a vertical dimension. A plurality of terminal accommodation chambers 20 are formed in the movable housing 25. Similarly to the terminal accommodating portion 13, the female first terminal fittings 21 are inserted into the terminal accommodation chambers 20 of the movable housing 25 from behind (back side). Wires 22 crimped to rear end parts of the first terminal fittings 21 are drawn out rearward to the outside of the terminal accommodating portion 13.

A front-rear dimension of the movable housing 25 is equal to that of the housing body 11 (terminal accommodating portion 13). A front-rear dimension of the terminal accommodation chambers 20 of the movable housing 25 is equal to that of the terminal accommodation chambers 20 of the housing body (terminal accommodating portion 13). Thus, the first terminal fittings 21 to be inserted into the terminal accommodation chambers 20 of the movable housing 25 and the first terminal fittings 21 to be inserted into the terminal accommodation chambers 20 of the housing body 11 are components of the same type.

Two pairs of vertically symmetrical first projections 26 are formed on a front end part of the movable housing 25. As shown in FIG. 3, a pair of the first projections 26 laterally spaced apart are formed in a laterally central part on the upper surface of the movable housing 25. A pair of the first projections 26 laterally spaced apart are also formed in a laterally central part on the lower surface of the movable housing 25. The front surfaces of the first projections 26 are inclined with respect to the front-rear direction (direction parallel to the connecting direction of the first and second housings 10, 40). The rear surfaces of the first projections 26 are at a right angle to the front-rear direction. The first projections 26 and the first arm portion 17 constitute an initial position holding portion 27.

A pair of bilaterally symmetrical second projections 28 are formed in a central part in the front-rear direction of the movable housing 25 (at positions behind the first projections 26). As shown in FIG. 4, the second projections 28 are disposed on both left and right outer side surfaces of the movable housing 25. The front surfaces of the second projections 28 are inclined with respect to the front-rear direction. The rear surfaces of the second projections 28 are at a right angle to the front-rear direction. The second projection 28 and the second arm portion 19 constitute a connection position holding portion 29.

As shown in FIG. 3, a pair of vertically symmetrical projection-like locking portions 30 are formed on both upper and lower surfaces of the movable housing 25. The locking portion 30 disposed on the upper surface of the movable housing 25 is located between the pair of left and right first projections 26 in the lateral direction. The locking portion 30 disposed on the lower surface of the movable housing 25 is also located between the pair of left and right first projections 26 in the lateral direction. That is, the first projections 26 and the locking portions 30 are in such a positional relationship as not overlap in the lateral direction. Therefore, the movable housing 25 can be molded by a mold (not shown) which is opened in the front-rear direction.

The movable housing 25 is accommodated into the housing accommodating portion 12 (movable chamber 14) from behind (back side) the housing body 11. The wires 22 connected to the first terminal fittings 21 of the movable housing 25 are drawn out rearward from the back surface (rear surface) of the movable housing 25. Therefore, the wires 22 of the movable housing 25 do not stand as an obstacle when the movable housing 25 is mounted into the housing accommodating portion 12 (housing body 11).

In the process of assembling the movable housing 25 with the housing body 11, the movable housing 25 reaches an initial position (see FIGS. 1 and 3) after passing through a connection position (see FIG. 4). When the movable housing 25 passes through the connection position, the second projections 28 pass through the second arm portions 19 by resiliently deforming the second arm portion 19 upward or downward. Since the second arm portions 19 are cantilevered in the same direction (forward) as an assembling direction of the movable housing 25 with the housing body 11, the second projections 28 are not caught by the second arm portions 19.

When the movable housing 25 reaches the initial position, the front surface of the movable housing 25 is disposed at the same position as that of the housing body 11 (housing accommodating portion 12) in the front-rear direction. That is, the front surface of the movable housing 25 is exposed on the front surface of the housing body 11. With the movable housing 25 located at the initial position, front end parts of the first arm portions 17 are in contact with the rear surfaces of the first projections 26 from behind as shown in FIG. 3. In this way, the movable housing 25 is restricted from being relatively displaced rearward (direction away from the second housing 40 and toward the connection position) with respect to the housing body 11. Further, the locking portions 30 come into contact with the retaining portions 18 of the first arm portions 17 from behind. In this way, the movable housing 25 is restricted from being relatively displaced forward (direction away from the second housing 40) with respect to the housing body 11.

By the locking action of the first arm portions 17, the first projections 26 and the locking portions 30, the movable housing 25 is restricted from being relatively displaced in the front-rear direction with respect to the housing body 11 and held at the initial position. Further, since the first arm portions 17 can be resiliently deformed in the vertical direction, the first projections 26 resiliently deform the first arm portions 17 to be locked to the front end parts of the first arm portions 17 in the process of assembling the movable housing 25 at the initial position. With the movable housing 25 located at the initial position, the second arm portions 19 are at positions separated rearward from the second projections 28 as shown in FIG. 4. Therefore, the connection position holding portions 29 do not exhibit a holding function.

The male connector includes the second housing 40 and a plurality of second terminal fittings 43. The second housing 40 includes a terminal holding portion 41 and a receptacle 42 in the form of a rectangular tube projecting forward from the outer peripheral edge of the front end of the terminal holding portion 41. The second terminal fittings 43 are held in the terminal holding portion 41. The second terminal fitting 43 is a male terminal formed with an elongated tab 44 in a front end part. The tab 44 is surrounded by the receptacle 42. All the second terminal fittings 43 mounted in the second housing 40 are arranged at the same position in the front-rear direction. The receptacle 42 is formed with a lock portion (not shown) lockable to the lock arm 23.

As shown in FIGS. 3 and 4, the second housing 40 is formed with a rectangular frame-like escaping recess 45 by recessing a part of the front surface of the terminal holding portion 41 (back end surface of the receptacle 42). The front end part of the housing accommodating portion 12 is accommodated into the escaping recess 45 when the first and second housings 10, 40 are connected. As shown in FIG. 3, a pair of upper and lower holding releasing portions 46 are formed in a region surrounded by the escaping recess 45, out of the front surface of the terminal holding portion 41. The holding releasing portions 46 are cantilevered forward (forward in the connecting direction of the second housing 40 to the first housing 10). In the terminal holding portion 41, accommodation recesses 47 are formed in base end parts of the holding releasing portions 46.

Next, functions of this embodiment are described. In connecting the first and second housings 10, 40, the movable housing 25 is held at the initial position as shown in FIGS. 3 and 4. In this state, the first terminal fittings 21 of the movable housing 25 are located forward of the first terminal fittings 21 of the housing body 11. If the first and second housings 10, 40 are opposed to each other with the movable housing 25 held at the initial position, a facing interval in the front-rear direction between the first terminal fittings 21 of the movable housing 25 and the second terminal fittings 43 is narrower than that between the first terminal fittings 21 of the housing body 11 and the second terminal fittings 43.

If the first housing 10 is inserted into the receptacle 42 in this state by gripping the housing body 11, the first arm portions 17 push the first projections 26, whereby the movable housing 25 enters the receptacle 42 integrally with the housing body 11. Then, the connection of the movable housing 25 and the second housing 40 is started and only the first terminal fittings 21 mounted in the movable housing 25 start to be connected to the second terminal fittings 43. At this point of time, the first terminal fittings 21 mounted in the housing body 11 are not connected to the second terminal fittings 43. Connection resistance generated when the first terminal fittings 21 and the second terminal fittings 43 are connected is maximized when the connection is started, and the connection resistance after the start of the connection is maintained at a relatively low value.

Figure 5:
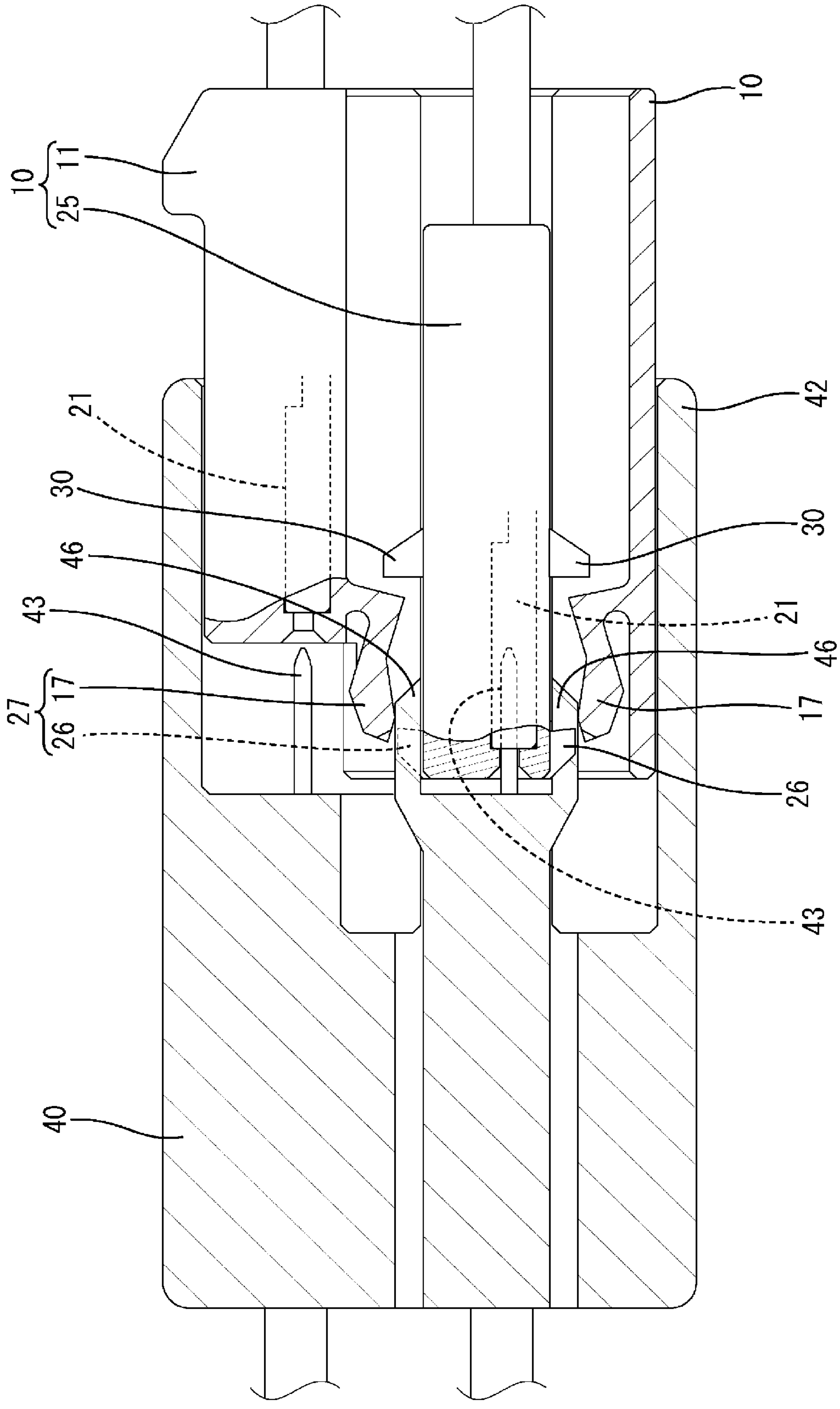
FIG. 5 is a section corresponding to line X-X showing a state where holding by initial position holding portions is released by holding releasing portions in a connection process of the first and second housings.
Figure 6:
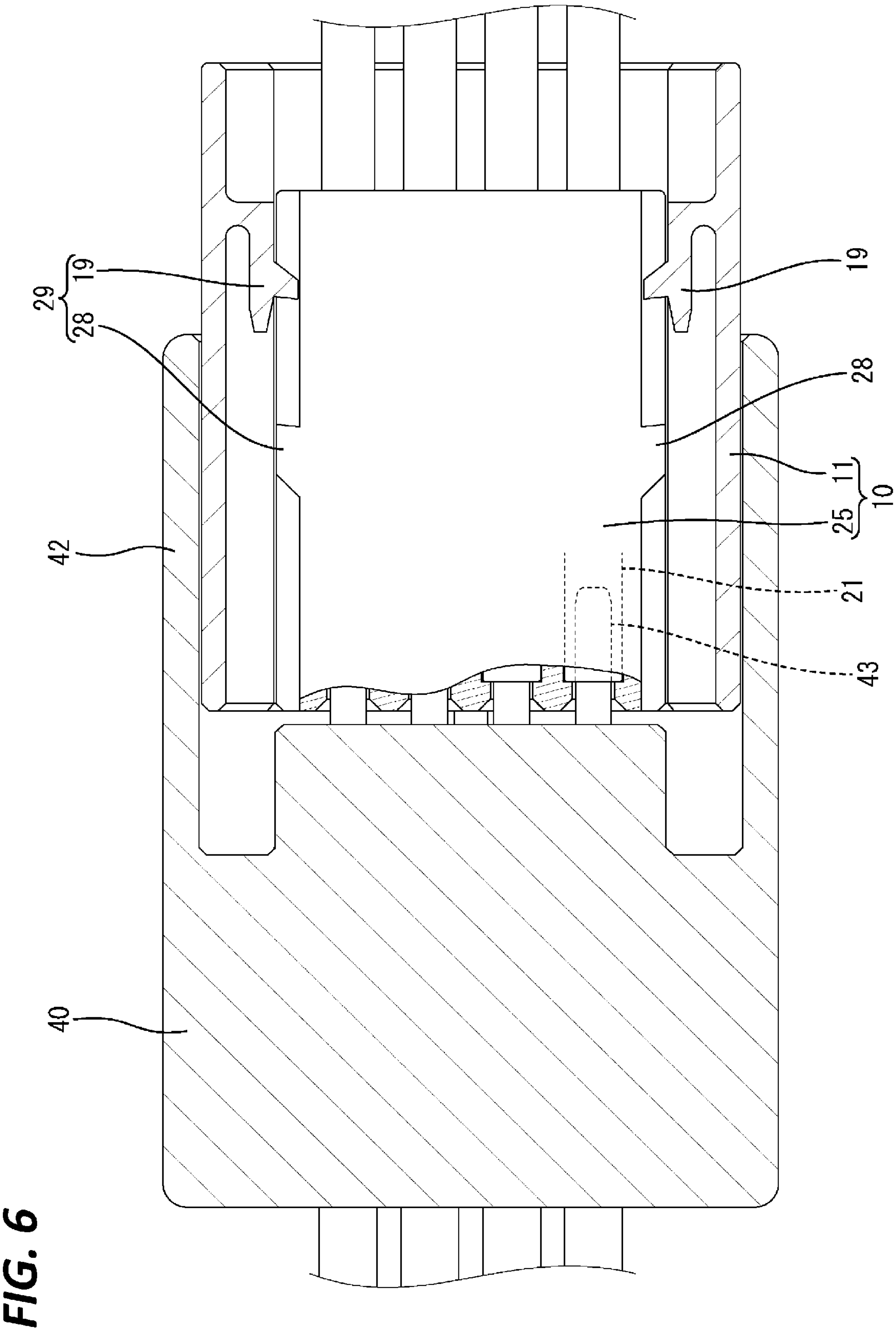
FIG. 6 is a section corresponding to line Y-Y showing the state where the holding by the initial position holding portions is released by the holding releasing portions in the connection process of the first and second housings.

When the connection of the movable housing 25 proceeds and the movable housing 25 reaches a position just before proper connection (immediately before proper connection), the holding releasing portions 46 are inserted between the pairs of the first projections 26 to resiliently deform the first arm portions 17 upward or downward away from the movable housing 25. At this time, as the connection proceeds, the first arm portions 17 are resiliently deformed more. Then, as shown in FIG. 5, before the movable housing 25 reaches a proper connection position, the first arm portions 17 are most resiliently deformed by the holding releasing portions 46 and the first arm portions 17 are disengaged from the first projections 26. At this point of time, as shown in FIG. 6, the second arm portions 19 are at positions separated rearward from the second projections 28.

When the first arm portions 17 are disengaged from the first housings 26, holding by the initial position holding portions 27 is released and the movable housing 25 becomes relatively displaceable rearward with respect to the housing body 11. In other words, the housing body 11 becomes relatively displaceable forward with respect to the movable housing 25. When the holding by the initial position holding portions 27 is released, the connection of the movable housing 25 is stopped by friction resistance between the first terminal fittings 21 of the movable housing 25 and the second terminal fittings 43.

When the holding by the initial position holding portions 27 is released, the connection of the housing body 11 and the second housing 40 is started and the connection of the first terminal fittings 21 mounted in the housing body 11 and the second terminal fittings 43 is started. The connection resistance generated between these is only due to friction between the first terminal fittings 21 of the housing body 11 and the second terminal fittings 43, and the connection resistance due to friction between the first terminal fittings 21 of the movable housing 25 and the second terminal fittings 43 is not generated.

Figure 8:
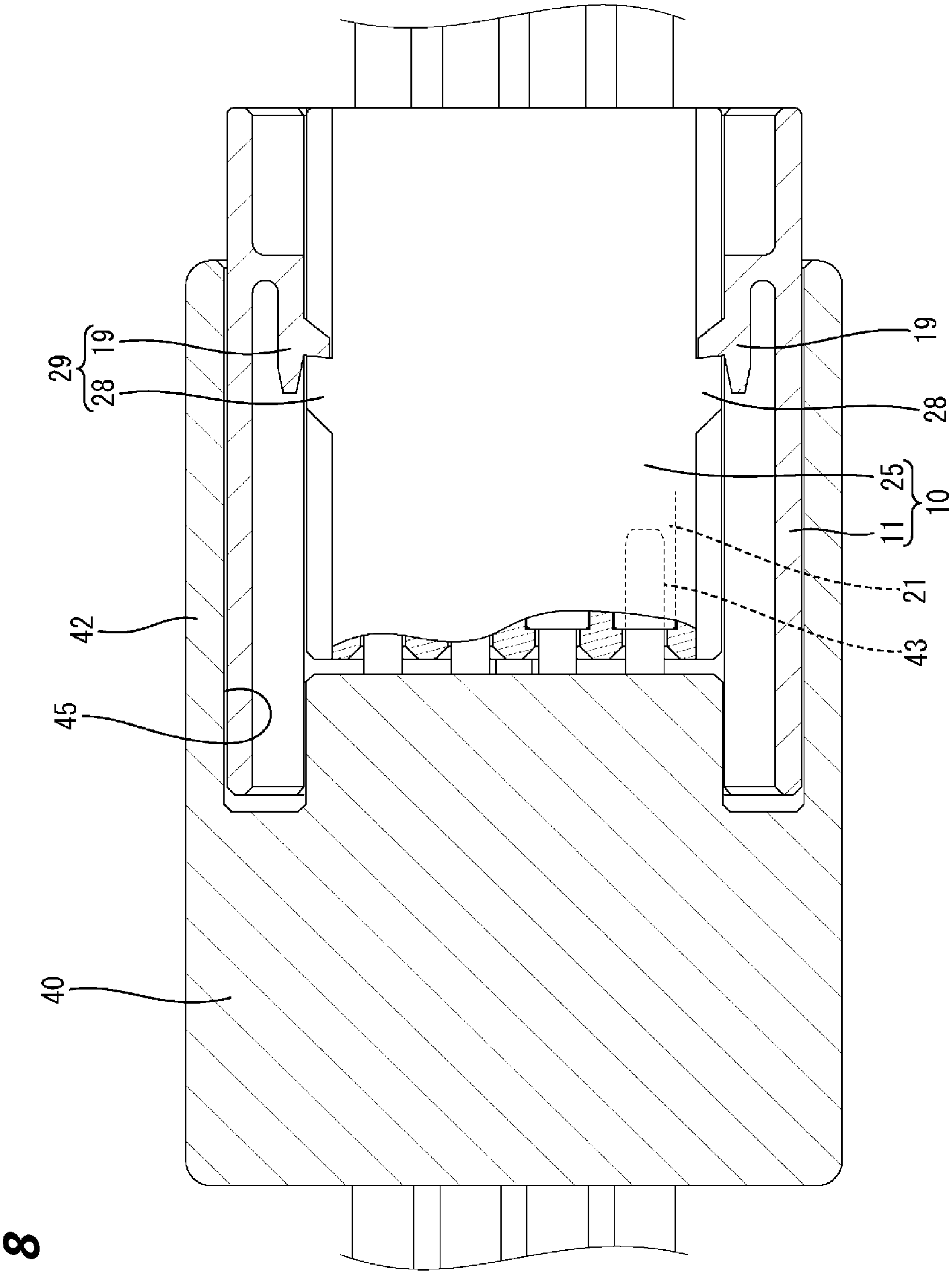
FIG. 8 is a section corresponding to line Y-Y in the state where the movable housing is held at the connection position in the connection process of the first and second housings.

While the connection of the housing body 11 and the second housing 40 proceeds, the movable housing 25 is relatively displaced toward the connection position with respect to the housing body 11. When the movable housing 25 reaches the connection position, the second arm portions 19 come into contact with the second projections 28 from behind as shown in FIG. 8. In this way, the movable housing 25 is held at the connection position with respect to the housing body 11. When the movable housing 25 reaches the connection position, the housing body 11 has not reached a proper connection position yet. The first terminal fittings 21 of the housing body 11 and the first terminal fittings 21 of the movable housing 25 are arranged at the same position in the front-rear direction.

Figure 7:
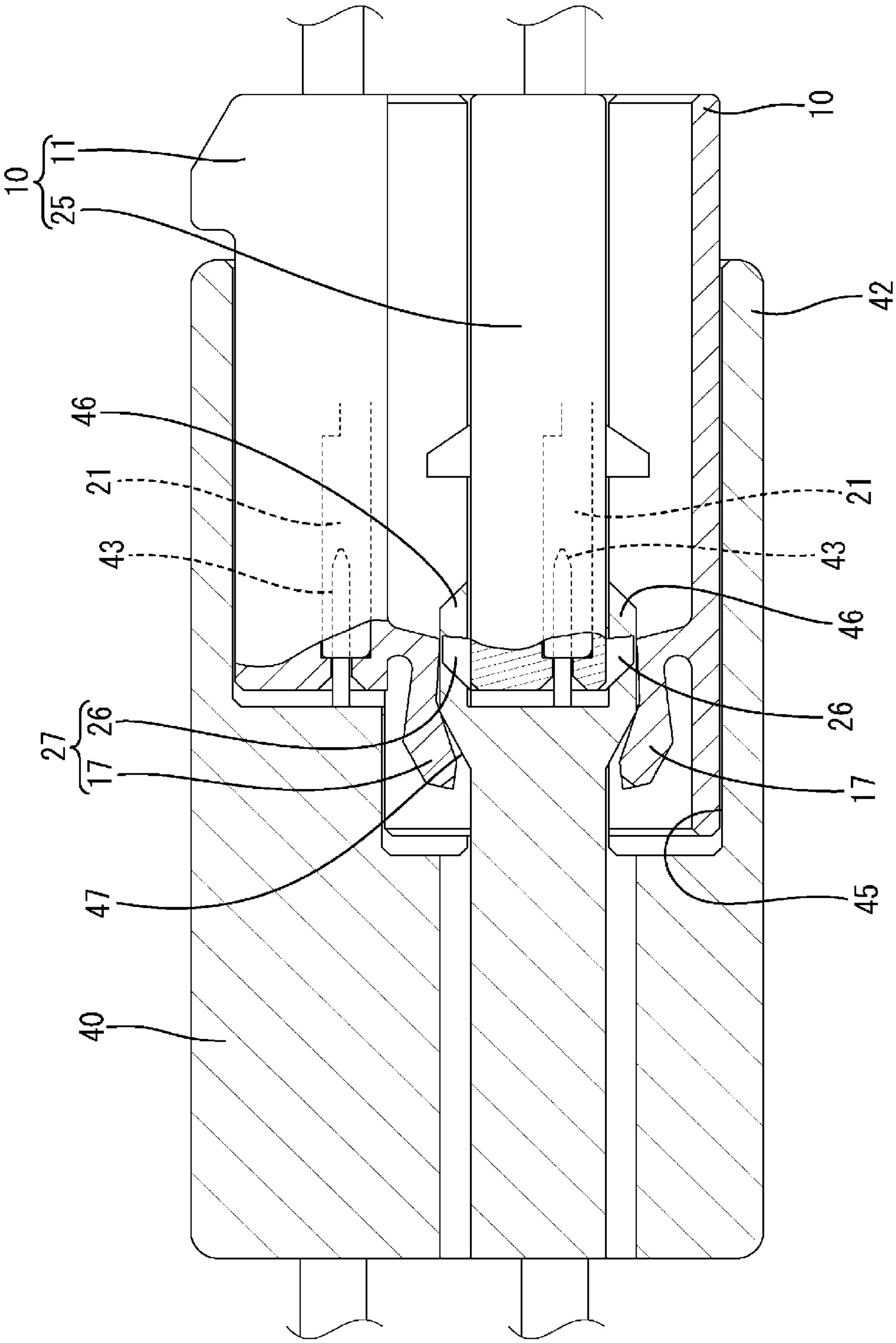
FIG. 7 is a section corresponding to line X-X in a state where a movable housing is held at a connection position in the connection process of the first and second housings.

When the movable housing 25 reaches the connection position, the first arm portions 17 pass through the holding releasing portions 46 and are accommodated into the accommodation recesses 47 as shown in FIG. 7. At this time, the first arm portions 17 resiliently return. Further, the rear surface of the movable housing 25 and that of the housing body 11 are arranged at the same position in the front-rear direction. Therefore, the rear surface of the movable housing 25 is exposed to be flush with the rear surface of the housing body 11.

Figure 9:
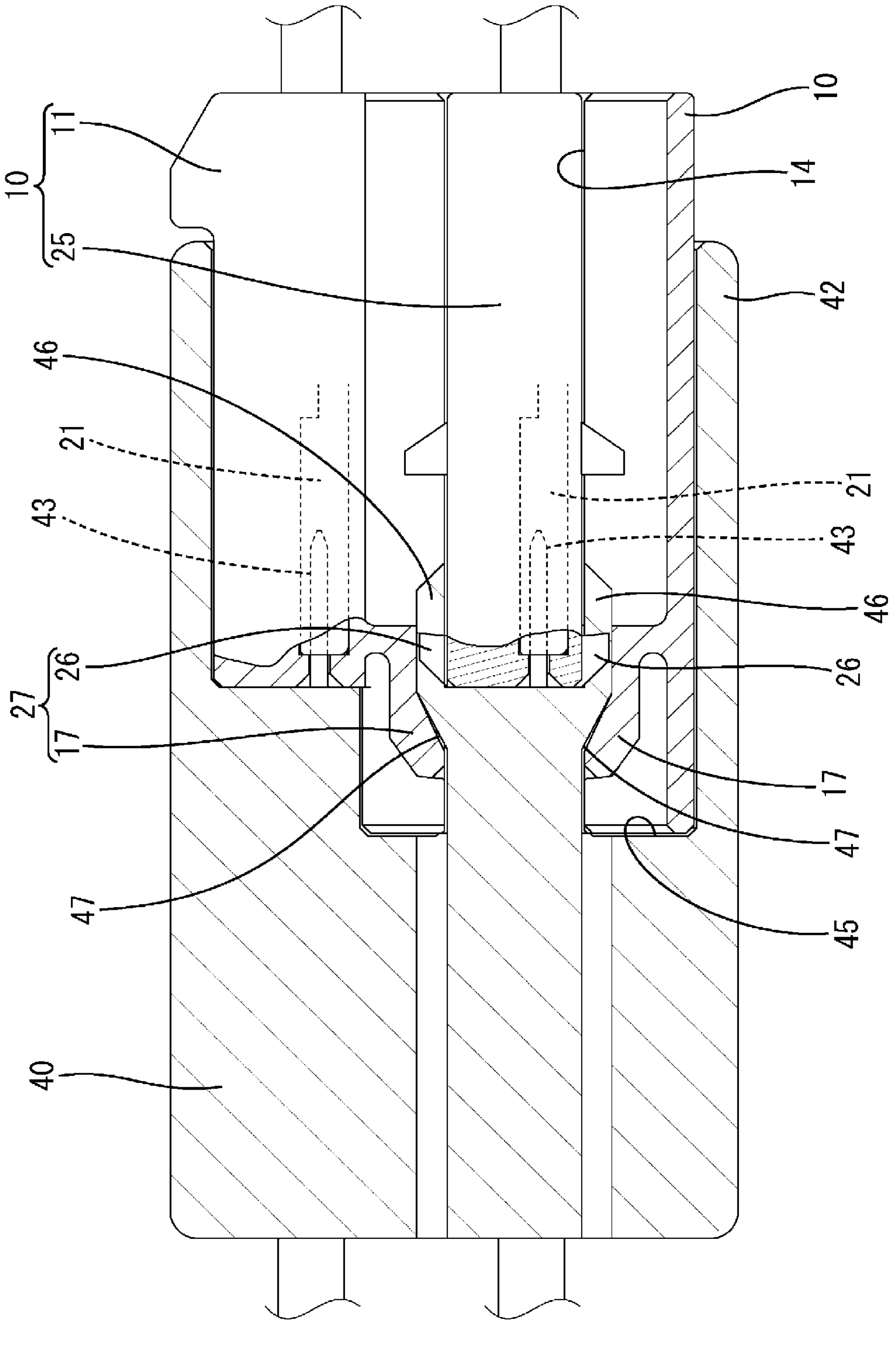
FIG. 9 is a section corresponding to line X-X showing a state where a housing body and the movable housing are properly connected.
Figure 10:
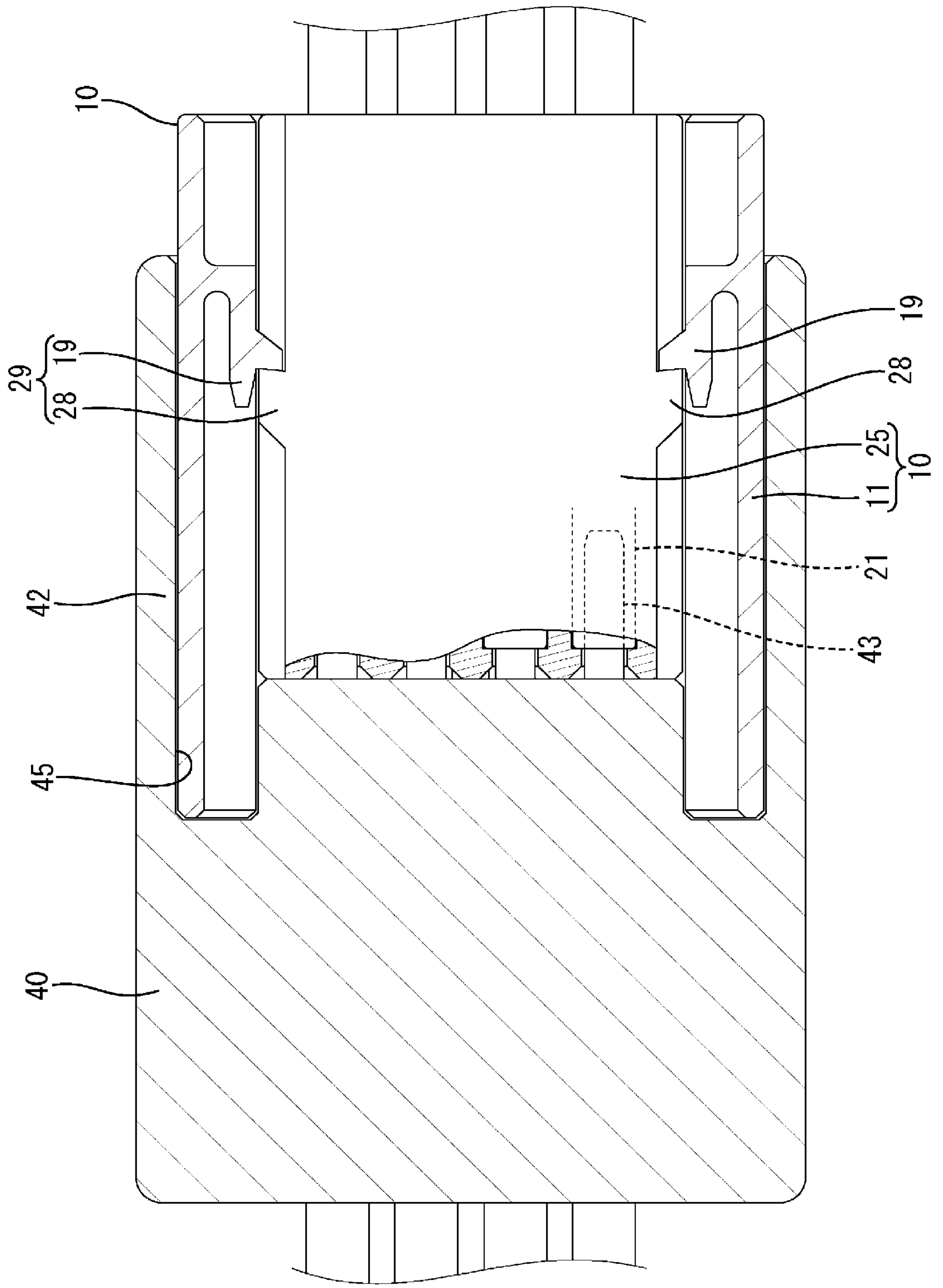
FIG. 10 is a section corresponding to line Y-Y showing the state where the housing body and the movable housing are properly connected.

If the housing body 11 is pushed forward from the state where the movable housing 25 is at the connection position, the second arm portions 19 come into contact with the second projections 28, whereby the movable housing 25 and the housing body 11 are integrally connected. That is, the movable housing 25 resumes the connection. In the process of integrally connecting the housing body 11 and the movable housing 25 to the second housing 40, a peak value of the connection resistance from the start to the end of the connection is suppressed to be low since the peak of the connection resistance has been passed Immediately after the movable housing 25 resumes the connection, the movable housing 25 and the housing body 11 simultaneously reach the proper connection position as shown in FIGS. 9 and 10. In the above way, the connection of the first and second housings 10, 40 is completed.

When the first and second housings 10, 40 are properly connected, the lock arm 23 of the housing body 11 is locked to the lock portion of the second housing 40, whereby the both housings 10, 40 are locked in a connected state. Further, since the lock arm 23 is formed on the housing body 11, the movable housing 25 is not separated rearward from the second housing 40.

In separating the first and second housings 10, 40, locking by the lock arm 23 is released and the housing body 11 is gripped and pulled rearward. Then, only the housing body 11 is first separated from the second housing 40. During this time, since the movable housing 25 remains to be connected to the second housing 40, the movable housing 25 is displaced relatively forward (toward the initial position) with respect to the housing body 11. When the movable housing 25 reaches the initial position, the retaining portions 18 of the first arm portions 17 come into contact with the locking portions 30 of the movable housing 25. Thus, thereafter, the movable housing 25 is separated from the second housing 40 integrally with the housing body 11.

As described above, the connector of this embodiment includes the first housing 10 and the second housing 40 to be connected to the first housing 10. The first housing 10 is configured by assembling the housing body 11 and the movable housing 25. The movable housing 25 is relatively displaceable between the initial position and the connection position with respect to the housing body 11. The first housing 10 includes the initial position holding portions 27 and the connection position holding portions 29. The initial position holding portions 27 restrict a relative displacement of the movable housing 25 at the initial position in the direction away from the second housing 40. The connection position holding portions 29 restrict a relative displacement of the movable housing 25 at the connection position in the direction away from the second housing 40.

With the movable housing 25 located at the initial position, a facing interval between the movable housing 25 and the second housing 40 is narrower than that between the housing body 11 and the second housing 40. With the movable housing 25 located at the connection position, the facing interval between the movable housing 25 and the second housing 40 is equal to that between the housing body 11 and the second housing 40.

In this embodiment, the "facing interval between the housing body 11 and the second housing 40" means a moving distance of the housing body 11 from a position facing the second housing 40 in a state before connection to a position where the connection to the second housing 40 is completed. The "facing interval between the movable housing 25 and the second housing 40" means a moving distance of the movable housing 25 from a position facing the second housing 40 in the state before connection to a position where the connection to the second housing 40 is completed. The second housing 40 is provided with the holding releasing portions 46 for releasing the holding by the initial position holding portions 27 when the movable housing 25 reaches the position just before the proper connection position in the connection process to the first housing 10.

According to the connector of this embodiment, if the connection of the first and second housings 10, 40 is started with the movable housing 25 held at the initial position, no connection resistance is generated between the first terminal fittings 21 of the housing body 11 and the second terminal fittings 43 of the second housing 40 in the initial stage of the connection. Therefore, the peak value of the connection resistance is suppressed to be low as compared to the case where the housing body 11 and the movable housing 25 are simultaneously connected to the second housing 40.

After the movable housing 25 reaches the position just before the proper connection position, the holding by the initial position holding portions 27 is released. Thus, the connection resistance is generated between the first terminal fittings 21 of the housing body 11 and the second terminal fittings 43, but no connection resistance is generated between the first terminal fittings 21 of the movable housing 25 and the second terminal fittings 43. Therefore, the peak value of the connection resistance is suppressed to be low in the same way as when the movable housing 25 and the second housing 40 are connected.

Since the movable housing 25 is held at the connection position in a final stage of the connection, the movable housing 25 and the housing body 11 are integrally properly connected. During this time, the connection resistance is generated in both the housing body 11 and the movable housing 25, but the connection resistance does not exceed the peak value as a whole since the peak of the connection resistance has been passed.

If the release of holding of the initial position holding portions 27 by the holding releasing portions 46 is set at the same timing as the proper connection of the movable housing 25, a situation where the holding by the initial position holding portions 27 cannot be released even if the movable housing 25 is properly connected possibly occurs depending on dimensional tolerances. In this case, since the movable housing 25 is stopped in front by abutting against the second housing 40, the connection of the housing body 11 and the second housing 40 can no longer proceed. In contrast, since the release timing of holding of the initial position holding portions 27 by the holding releasing portions 46 is set to a timing before the arrival of the movable housing 25 at the proper connection position, the holding of the initial position holding portions 27 can be reliably released.

Further, the movable housing 25 can be held at the connection position with respect to the housing body 11. With the movable housing 25 located at the connection position, the facing interval between the movable housing 25 and the second housing 40 is equal to that between the housing body 11 and the second housing 40. Thus, the movable housing 25 can also be properly connected by properly connecting the housing body 11. Therefore, according to the connector of this embodiment, the peak value of the connection resistance can be reduced without hindering the connecting operation.

Further, with the movable housing 25 located at the initial position, the movable housing 25 is at least partially accommodated in the housing body 11. In this way, the interference of external matters with the movable housing 25 can be prevented when the movable housing 25 is at the initial position. With the movable housing 25 located at the initial position, the initial position holding portions 27 (first arm portions 17 and first projections 26) are exposed on the outer surface of the housing body 11. In this way, whether or not the initial position holding portions 27 are exhibiting the holding function can be visually confirmed.

Further, the initial position holding portion 27 is composed of the resiliently deformable first arm portion 17 formed on the housing body 11 and the first projections 26 formed on the movable housing 25. A movement of the movable housing 25 from the initial position toward the connection position is restricted by the first arm portions 17 butting against the first projections 26. According to this configuration, the initial position holding portions 27 exhibit the holding function without bringing the holding releasing portions 46 into contact with the first arm portions 17. Therefore, the movable housing 25 can be held at the initial position also with the first and second housings 10, 40 separated.

Further, the second housing 40 is formed with the accommodation recesses 47. In a state where the holding releasing portions 46 resiliently deform the first arm portions 17 to disengage the first arm portions 17 from the first projections 26, the resiliently returned first arm portions 17 can be accommodated in the accommodation recesses 47. According to this configuration, the plastic deformation of the first arm portions 17 by being kept resiliently deformed can be prevented.

Further, the connection position holding portion 29 is composed of the resiliently deformable second arm portion 19 formed on the housing body 11 and the second projection 28 formed on the movable housing 25. The connection position holding portions 29 exhibit the holding function by the second arm portions 19 butting against the second projections 28 from the back surface side (behind). Although the wires 22 are drawn out from the back surface side of the movable housing 25, the movable housing 25 can be assembled with the housing body 11 from the back surface side.

Further, the housing body 11 is formed with the retaining portions 18 and the movable housing 25 is formed with the locking portions 30. When the movable housing 25 is at the initial position, the locking portions 30 are locked to the retaining portions 18, thereby restricting a relative displacement of the movable housing 25 in a direction toward the second housing 40. According to this configuration, in separating the first housing 10 from the second housing 40, if the housing body 11 is pulled rearward, the locking portions 30 are locked to the retaining portions 18, whereby the movable housing 25 is separated from the second housing 40 integrally with the housing body 11. Further, since the retaining portions 18 are integrally formed to the initial position holding portions 27 (first arm portions 17), the shape of the housing body 11 can be simplified as compared to the case where the retaining portions 18 are formed in locations different from the initial position holding portions 27 (first arm portions 17).

Other Embodiments

The present invention is not limited to the above described and illustrated embodiment and is represented by claims. The present invention is intended to include all changes in the scope of claims and in the meaning and scope of equivalents and also include the following embodiments.

Although the initial position holding portion is composed of the first arm portion formed on the housing body and the first projections formed on the movable housing in the above embodiment, the initial position holding portion may be composed of projection(s) formed on the housing body and an arm portion formed on the movable housing.

Although the connection position holding portion is composed of the second arm portion formed on the housing body and the second projection formed on the movable housing in the above embodiment, the connection position holding portion may be composed of a projection formed on the housing body and an arm portion formed on the movable housing.

Although the movable housing is accommodated in the housing body in the above embodiment, the housing body may be accommodated in the movable housing.

Although the movable housing is held at the initial position without the holding releasing portions contacting the first arm portions and the holding by the initial position holding portions is released by the holding releasing portions resiliently deforming the first arm portions to separate the first arm portions from the first projections in the above embodiment, the movable housing may be held at the initial position by the holding releasing portions restricting the resilient deformation of the first arm portions and the holding by the initial position holding portions may be released by the holding releasing portions being disengaged from the first arm portions to enable the resilient deformation of the first arm portions.

Although the movable housing is partially (part except the first projections) accommodated in the housing body with the movable housing held at the initial position in the above embodiment, the movable housing may be entirely accommodated in the housing body with the movable housing held at the initial position.

Although the entire movable housing is accommodated in the housing body with the movable housing held at the connection position in the above embodiment, the movable housing may partially project to the outside of the housing body with the movable housing held at the connection position.

Although the retaining portions are integrally formed to the initial position holding portions (first arm portions) in the above embodiment, the retaining portions may be formed in locations different from the initial position holding portions (first arm portions).

LIST OF REFERENCE NUMERALS

10: first housing
11: housing body
12: housing accommodating portion
13: terminal accommodating portion
14: movable chamber
15: first mold removal space
16: second mold removal space
17: first arm portion
18: retaining portion
19: second arm portion
20: terminal accommodation chamber
21: first terminal fitting
22: wire
23: lock arm
25: movable housing
26: first projection
27: initial position holding portion
28: second projection
29: connection position holding portion
30: locking portion
40: second housing
41: terminal holding portion
42: receptacle
43: second terminal fitting
44: tab
45: escaping recess
46: holding releasing portion
47: accommodation recess
F: female connector
M: male connector

What is claimed is:

1. A connector, comprising:

a first housing; and a second housing to be connected to the first housing, wherein:

the first housing includes a housing body and a movable housing relatively displaceable between an initial position and a connection position with respect to the housing body, the first housing includes an initial position holding portion for restricting a relative displacement of the movable housing at the initial position in a direction away from the second housing and a connection position holding portion for restricting a relative displacement of the movable housing at the connection position in the direction away from the second housing, a facing interval between the movable housing and the second housing is narrower than that between the housing body and the second housing with the movable housing located at the initial position, the facing interval between the movable housing and the second housing is equal to that between the housing body and the second housing with the movable housing located at the connection position, and the second housing is provided with a holding releasing portion for releasing holding by the initial position holding portion when the movable housing reaches a position just before a proper connection position in a connection process to the first housing.

2. The connector of claim 1, wherein the movable housing is at least partially accommodated in the housing body with the movable housing located at the initial position.

3. The connector of claim 2, wherein the initial position holding portion is exposed on an outer surface of the housing body with the movable housing located at the initial position.

4. The connector of claim 1, wherein:

the housing body is formed with a retaining portion, the movable housing is formed with a locking portion, and a relative displacement of the movable housing in a direction toward the second housing is restricted by the locking portion locking the retaining portion when the movable housing is at the initial position.

5. The connector of claim 4, wherein the retaining portion is integrally formed to the initial position holding portion.

* * * * *